July 16, 1935.  G. W. CLARVOE  2,008,654
VIBRATION DAMPING MATERIAL
Filed May 3, 1932
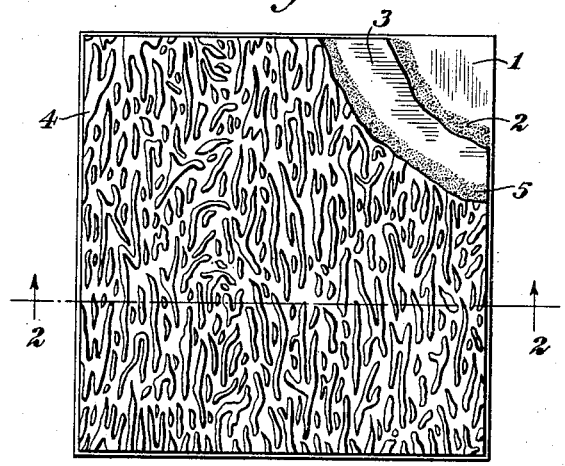
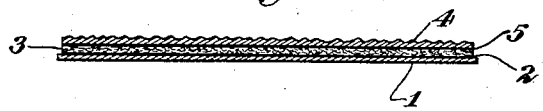
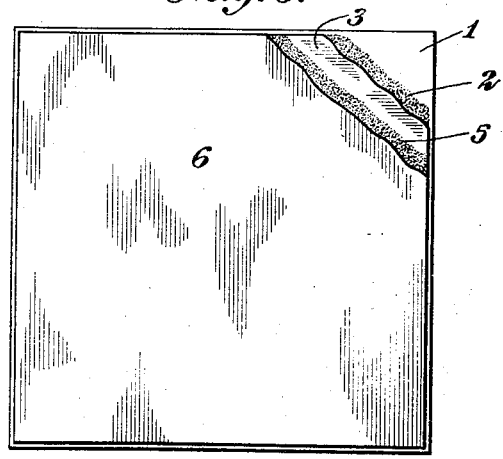
INVENTOR
George W. Clarvoe.
BY
ATTORNEY Patented July 16, 1935

2,008,654

UNITED STATES PATENT OFFICE 2,008,654

VIBRATION DAMPING MATERIAL

George W. Clarvoe, Somerville, N. J., assignor to Johns-Manville Corporation, New York, N. Y., a corporation of New York Application May 3, 1932, Serial No. 608,913

4 Claims. (Cl. 154—44)

This invention relates to a vibration damping material and the methods of making and assembling the same.

The need of damping vibrations may be illustrated by reference to an automobile body. When the body is moving at high speed, impulses are transmitted to vibratile members such as the doors, floor boards, seat backs, and the like. Unless means are taken to damp or deaden the vibrations, there is generated sound, such as rumbling or drumming effects.

In studying this problem of minimizing vibrations in order to decrease the production of sound, I have arrived at certain general conclusions which are of asistance in designing a preferred vibration damping structure. The vibration damping material may be itself non-vibratile or substantially inelastic and should be continuously adhered to the vibratile member by means of a cementing layer of such properties that it withstands conditions of use, that is, neither cracks at the lowest temperature under the most severe stress to which the structure is submitted, nor softens sufficiently to allow the non-vibratile member to be loosened from the vibratile member at the highest temperature to which the structure is subjected. The properties required of the cement will be understood to be rather rigid, when it is realized that the assembled structure, such as a sheet metal car door with the vibration damping material adhered thereto by means of the cement, is subjected, in many cases, to temperatures as high as 300° F. during fabrication of the car; the cement layer must be adherent when exposed for a short time to that temperature. On the other hand, the cement must withstand winter temperatures, say temperatures as low as —20° F. Furthermore, the cement is under the constant requirement, when the car is moving at a high speed, of holding the non-vibratile member to a vibrating sheet which tends alternately first to compress the cement and then pull away from it, as well as to flex it. The vibration damping material must also withstand these extremes of conditions, as, for example, without cracking or becoming incompressible at the low temperature or bleeding at the elevated temperature.

While the invention is not limited to any theory or explanation, there is postulated a theory of vibration damping which may serve to make the invention more readily understandable. When vibrations are deadened or damped, there is a decrease in the energy of vibration. In the structure of the present invention, this loss of energy is probably due in part to the work done upon the vibration damping material, as, for example, in alternately compressing and expanding it. Thus, in every vibration cycle the vibratile member, particularly at positions of considerable amplitude of vibration, moves towards the vibration damping material and then away from it. If the material selected for damping the vibration were itself elastic, that is, of high modulus of elasticity as calculated from Hooke's law, and if readily set in vibration by vibratory impulses, there would be joint vibration of the so-called vibratile member and the material which was unwisely selected to damp the vibrations. If, on the other hand, the member applied to damp the vibrations not only has considerable inertia or weight but also is compressible, expansible, and inelastic, then as the vibrating member moves towards the damping material which is continuously secured to the vibrating member, the damping material is slightly compressed without any considerable restoring forces being set up therein. When the vibrating member moves away from the damping material, there is expansion and stretching of the expansible damping material. Also, the damping material may be slightly displaced, in its entirety, from one side to the other. The result of the expenditure of the energy of vibration in overcoming forces of a frictional nature is to cause the motion to subside.

Attempts to use saturated felted fibrous sheets, such, for example, as prepared roofing paper, for vibration damping, have not been entirely successful. While such papers have adequate weight and, therefore, inertia, they are not as compressible and expansible as desired, because the pores of the felt are well filled with impregnating material. Also, the fact that the pores are well filled, in other words, saturated with asphalt, for example, causes the sheet to fail when subjected to elevated temperatures such as prevail usually at one stage in the manufacture of an automobile body containing vibration damping material. Thus, if such roofing paper is applied to the inner side of a sheet metal automobile door and the door is finished in a conventional manner involving forced drying, as at 300° F., of a finishing material, such as a priming coat or a finishing coat of pyroxylin enamel, the impregnating material or saturant will bleed from the roofing paper.

On the other hand, unimpregnated felts are not satisfactory, even if covered on both sides with waterproofing material. The fibers in an unimpregnated rag felt, for example, are subject to dry rot or other deteriorative influences, possibly because they are not individually moisture proof. Furthermore, there is less inertia (mass) in an unimpregnated rag felt than in one which has been impregnated with a substantial amount of viscous material, say with an equal weight or more of asphalt. Also, the relatively soft unimpregnated rag felt uses up less energy when it is compressed or expanded.

With these considerations in mind, there has been provided a structure which represents a substantial improvement in effectiveness, convenience of application, durability, and/or appearance as compared to previously used damping means.

An embodiment of the invention that is preferred at this time is illustrated in the drawing in which Fig. 1 is a plan view of a vibration damped assembly, with parts broken away for clearness of illustration.

Fig. 2 is a cross sectional view of the same assembly on line 2—2 of Fig. 1.

Fig. 3 is a plan view of a modification of the invention, with parts broken away for clearness of illustration.

In the figures, reference character 1 indicates a vibratile member, as, for example, tinned sheet steel, of the type and thickness used in constructing automobile bodies, 2 is a cementing layer, 3 is a vibration damping member adhered by the cementing material to the vibratile member, 4 is a layer of finishing material applied on the outside of the vibration damping member, that is, to the face thereof that is remote from the vibratile member, and adhered thereto by means of an adhesive or cementing layer 5, and 6 is a mass adding member similarly adhered to the damping member.

The layer of finishing material 4 may be omitted. If it is omitted, the cementing layer 5 is also omitted. However, the finishing layer may serve to protect an otherwise easily injured layer of vibration damping material or to give a pleasing appearance to the vibration damping structure. Thus, in treating the inside of the metal sheet of a door of an automobile body, there may be applied the vibration damping material and over that the finishing material, say, in the form of a layer of paper. The paper may be embossed and coated with a material that is not a solvent for the impregnant used in the vibration damping material. Thus, a pyroxylin enamel coating may be used to establish a color desired and produce a tough surface, without dissolving the impregnating material. Also, such finishing material will decrease evaporation of the impregnating material under the influence of prolonged, elevated temperatures due, for example, to the heat of a gasoline motor, and thus prevent a change from the desired critical proportions of impregnating material to fiber originally established in the damping material.

When the finishing material adds substantial rigidity or mass, an additional purpose is served. Thus, the member 6, which may consist of dense material, such as metal, suitably lead foil or other heavy, non-vibratile metal sheeting, adds substantial mass or inertia at such a position as to minimize the displacement of the damping member as a whole, during vibration of the adhered vibratile member, and yet preserve the compressibility and expansibility of the damping material. The result is very effective vibration damping at a minimum initial cost.

In making a vibration damped assembly, such as the one illustrated in Figs. 1–3, there is first produced a preformed sheet of improved vibration damping properties. This sheet may then be coated on one side with an adhesive or cement composition. The coated unit may then be allowed to stand until the adhesive or cement composition has the proper consistency. Finally, the sheet is adhesively secured continuously to a surface of the vibratile member. If desired, additional sheets of the vibration damping material may be applied over the first sheet, in the same manner as that in which the first sheet was applied to the vibratile member. If the layer of mass adding or finishing material is to be used in the assembly, it may also be treated with an adhesive or cement composition and applied to the outside surface of the vibration damping material; or the adhesive or cement composition may be first applied to the outside of the vibration damping member and the mass adding or finishing material then pressed against this surface. In any case, the material is secured to the surface of the damping member, suitably continuously by means of a cementing layer.

For a structure with the properties that have been indicated above, it was necessary to develop a satisfactory vibration damping material. This has been done by a departure from a conventional process of making prepared roofing paper.

Thus, I have first formed a felted fibrous sheet comprising soft fibers, say approximately 80% of rag fiber and 20% of cellulosic fibers, such as newsprint. This sheet is produced, for example, by beating the mixed fibers with water into a stock suitable for the furnish of a paper machine, forming the fibers into a felt or thick paper, and then drying and finishing in a usual manner. A felt that has been so made and has been found satisfactory for the present purpose weighs approximately 11 pounds per 100 square feet and has a thickness varying from approximately 0.05 to 0.06 inch. It is understood that thicker or thinner felts may be used; the thicker felts are adapted to give, on impregnation, a vibration damping material that is more effective in single thickness, but, on the other hand, is more expensive per unit of area than the thinner felts.

The dried felt is then subjected to impregnation with an impregnating material that will not be too fluid at elevated temperatures or too stiff at low temperatures. Thus, there has been used as impregnating material, a rather soft asphalt that insures compressibility and expansibility of the impregnated felt, even at low winter temperatures. It has been used in such a proportion that it will not bleed from the impregnated product when the latter is subjected for a short period of time to an elevated temperature, such as 300° F.

A type of asphalt sometimes used as impregnating material is one called "Mexican flux", an impregnating material commonly used in roofing paper. A sample of asphalt used had a specific gravity of 1.04 at 60° F. and a melting point above 100° F. (by the ball and ring method of the American Society for Testing Materials).

The impregnating material is first melted or made fluid and is maintained at an elevated temperature at which the impregnating material is adapted to penetrate a porous felt passed therethrough, as, for example, at 350 to 410° F. The felt is then passed through the impregnating material in a conventional manner with certain exceptions, including the fact that the absorption of impregnating material is decreased, as by shortening the time of contact between the felt and the impregnating material, either by moving the felt through the impregnating material at a higher speed than usual or by passing the felt through the impregnating material a fewer number of times. Thus, for a given set of conditions of impregnation, the felt may be passed 2 to 4 times through the impregnating material, as compared to 7 to 10 times in the making of roofing paper. As the felt leaves the impregnating material for the last time, the impregnated felt is passed between squeeze rolls or between scrapers which are carefully adjusted to leave only a selected amount of impregnating material on the surface. Regardless of the particular type of change from the conventional process, the impregnation is discontinued before the felt is saturated, in order to leave some pore space in the impregnated product, thereby producing a product that is readily compressible, flexible and expansible, that is, more compressible and expansible than conventionally prepared roofing paper. The felt has such a degree of saturation or under-saturation as to prevent bleeding (oozing) of the impregnating material from the product at elevated temperatures, such as 300° F., and has, on the other hand, moderate inertia and rigidity, that is, more than possessed by the same felt unimpregnated, whereby energy is more readily removed from a vibratile member by the impregnated than by the unimpregnated product.

The preferred proportion of impregnating material such as asphalt to the weight of unimpregnated sheet, will vary somewhat with the type of felt used. With any given felt, a few simple trials will indicate the proportion of impregnating material which best fulfills the requirements described. Usually 90 to 140 parts of asphalt, suitably 100 to 130 parts, are used for each 100 parts of unimpregnated felted fibrous sheet. I have used to advantage approximately 120 parts of asphalt to 100 parts of the unimpregnated sheet. All proportions here, as elsewhere in the specifications and claims, are expressed as parts by weight.

With usual felts, the percentage of complete saturation by asphalt should be 40 to 80, preferably 50 to 60. Thus, with a felt of the kind made as described in detail above, there has been used 60% as much asphalt as could be introduced into the felt at complete saturation. Such products are substantially under-saturated. The terms "saturated" and "saturation" are used herein to refer to the condition existing in conventional asphalt-impregnated felts for roofing.

With such an incompletely saturated felt, there may be initially uneven distribution of the impregnating material. To distribute uniformly the asphalt which is present in less than sufficient quantity to saturate the felt completely, the impregnated felt may be kept warm, say between 300 and 375° F., for a substantial period of time, say 6 minutes, during which the melted or fluid asphalt gradually migrates through the felt and becomes properly distributed. The felt is then air-cooled to a temperature below about 200° F. The cooled felt is then formed into rolls for shipment.

A vibration damping sheet made as described comprises a yieldable, resilient skeleton of contacting felted fibers and a yieldable mass-adding ingredient of the type of asphalt distributed in substantially uniform proportion throughout the said skeleton.

While a felt comprising rag fiber and wood pulp in the form of newsprint has been described, it should be understood that other felts may be used, provided the felt is adapted to give impregnated products that meet the requirements set forth. Thus, felts consisting of asbestos fibers may be used.

Other mass-adding non-resilient impregnating materials meeting the specifications may be used in place of asphalt, particularly, waterproof, non-resilient (inelastic), non-drying (non-oxidizing), viscous liquids of low susceptibility to change of viscosity with temperature. Thus there may be used stearin pitch, although stearin pitch is considerably more costly than asphalt per unit of weight and does not possess offsetting features of advantage.

Certain requirements of the cementing compositions have been set forth, particularly the ability of the cementing layer to withstand vibrations and temperature changes over a wide range.

A cement composition that meets the severe requirements and that is preferred at this time may be made of the following:

Cement composition

| | Percent by weight |
|---|---|
| Hard stearin pitch | 17 |
| Rosin | 14 |
| Blown castor oil | 3 |
| Mineral spirits (Varnolene) | 10 |
| Gasoline | 15 |
| Pulverized slate dust | 25 |
| Very short fiber asbestos | 16 |
| Total | 100 |

Although described particularly as applied to damping vibrations of sheet metal such as used in an automobile body, the invention may be applied to damping other vibrating members, as, for example, parts of a machine or railway car. The member whose vibrations are damped may be of metal, wood, or other vibratile material, advantageously in the form of thin sheets. The invention is particularly adapted to damp vibrations of audible frequency.

Many variations from the illustrative details that have been given may be made without departing from the spirit of the invention. It is intended, therefore, that such variations should be included within the scope of the claims.

What I claim is:

1. A vibration-damping material comprising a preformed flexible and readily compressible sheet including a skeleton of contacting fibers and a non-resilient mass-adding ingredient impregnated into and distributed substantially uniformly therethroughout the proportion of the mass-adding ingredient being insufficient to saturate the sheet.

2. A vibration-damping material comprising a preformed flexible and readily compressible sheet including a skeleton of contacting fibers of the type of a rag felt and a mass-adding ingredient of the type of asphalt impregnated into and distributed substantially uniformly therethroughout, the proportion of the mass-adding ingredient being of the order of 40 to 80% of the amount required to saturate the sheet.

3. A vibration-damping material comprising a preformed moisture-proof flexible and readily compressible sheet including a skeleton of contacting fibers and a non-resilient mass-adding ingredient impregnated into and distributed substantially uniformly therethrough, the proportion of the mass-adding ingredient being insufficient to saturate the sheet and being not substantially greater than 80 per cent of the proportion required for saturation of the said sheet.

4. A vibration-damping material comprising a preformed flexible and readily compressible sheet including a skeleton of contacting fibers of the type of a rag felt and a mass-adding ingredient of the type of asphalt impregnated into and distributed substantially uniformly therethroughout, the proportion of the mass-adding ingredient being of the order of 90 to 140 parts by weight to 100 parts of the said skeleton.

GEORGE W. CLARVOE.